(12) United States Patent
Kim et al.

(10) Patent No.: US 12,155,059 B2
(45) Date of Patent: Nov. 26, 2024

(54) SECONDARY BATTERY AND METHOD FOR MANUFACTURING THE SAME

(71) Applicant: LG ENERGY SOLUTION, LTD., Seoul (KR)

(72) Inventors: Nam Won Kim, Daejeon (KR); Eun Sun Choi, Daejeon (KR); So Ra Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 490 days.

(21) Appl. No.: 17/432,351

(22) PCT Filed: Mar. 31, 2020

(86) PCT No.: PCT/KR2020/004432
§ 371 (c)(1),
(2) Date: Aug. 19, 2021

(87) PCT Pub. No.: WO2020/209539
PCT Pub. Date: Oct. 15, 2020

(65) Prior Publication Data
US 2022/0158170 A1 May 19, 2022

(30) Foreign Application Priority Data
Apr. 8, 2019 (KR) .................. 10-2019-0040973

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0404* (2013.01); *H01M 4/366* (2013.01); *H01M 10/0585* (2013.01); *H01M 10/0525* (2013.01)

(58) Field of Classification Search
CPC .... H01M 4/139; H01M 4/0404; H01M 4/366; H01M 10/0585; H01M 10/0525
(Continued)

(56) References Cited

U.S. PATENT DOCUMENTS

| | | |
|---|---|---|
| 2006/0127774 A1 | 6/2006 | Kim et al. |
| 2009/0111011 A1 | 4/2009 | Kim et al. |

(Continued)

FOREIGN PATENT DOCUMENTS

| | | |
|---|---|---|
| CN | 1770537 A | 5/2006 |
| CN | 101425574 A | 5/2009 |

(Continued)

OTHER PUBLICATIONS

International Search Report for PCT/KR2020/004432 mailed on Jul. 8, 2020.

(Continued)

*Primary Examiner* — James M Erwin
*Assistant Examiner* — John S Medley
(74) *Attorney, Agent, or Firm* — Birch, Stewart, Kolasch & Birch, LLP

(57) ABSTRACT

A secondary battery includes: a first electrode provided with a first collector and a first electrode active material applied on at least one surface of the first collector; and a second electrode provided with a second collector and a second electrode active material applied on at least one surface of the second collector, wherein an uneven coating portion at which the first electrode active material irregularly increases in amount and is applied is provided on at least one of a coating start portion or a coating end portion of the first electrode active material, and an inactive coating portion configured to cover the uneven coating portion is provided on at least one of a coating start portion or a coating end (Continued)

portion of the second electrode active material. A method of manufacturing the secondary battery is also provided.

13 Claims, 7 Drawing Sheets

(51) Int. Cl.
*H01M 4/36* (2006.01)
*H01M 10/0585* (2010.01)
*H01M 10/0525* (2010.01)

(58) Field of Classification Search
USPC .............................................. 429/218, 218.1
See application file for complete search history.

(56) References Cited

U.S. PATENT DOCUMENTS

| 2011/0039146 | A1 | 2/2011 | Sato et al. |
| 2012/0034504 | A1* | 2/2012 | Kaneda ............. H01M 10/0587 |
| | | | 429/94 |
| 2013/0260211 | A1 | 10/2013 | Min et al. |
| 2014/0193699 | A1 | 7/2014 | Kim et al. |
| 2016/0164070 | A1 | 6/2016 | Sato |
| 2018/0138482 | A1* | 5/2018 | Sakurai ............... H01M 50/426 |
| 2019/0237745 | A1 | 8/2019 | Sato |
| 2019/0237746 | A1 | 8/2019 | Sato |
| 2019/0237767 | A1 | 8/2019 | Ko et al. |
| 2021/0126249 | A1 | 4/2021 | Kim et al. |

FOREIGN PATENT DOCUMENTS

| CN | 105453329 A | 3/2016 |
| EP | 2 056 376 A1 | 5/2009 |
| JP | 2002-124249 A | 4/2002 |
| JP | 2006-172808 A | 6/2006 |
| JP | 2010-103089 A | 5/2010 |
| JP | 2010-262773 A | 11/2010 |
| JP | 2016-81848 A | 5/2016 |
| KR | 10-2005-0096290 A | 10/2005 |
| KR | 10-0591436 B1 | 6/2006 |
| KR | 10-2010-0016705 A | 2/2010 |
| KR | 10-2011-0054024 A | 5/2011 |
| KR | 10-2012-0060700 A | 6/2012 |
| KR | 10-2016-0002601 A | 1/2016 |
| KR | 10-2017-0100377 A | 9/2017 |
| KR | 10-2018-0014520 A | 2/2018 |
| KR | 10-2019-0020618 A | 3/2019 |
| WO | WO 2010/035120 A1 | 4/2010 |

OTHER PUBLICATIONS

Extended European Search Report for European Application No. 20787002.3, dated Apr. 19, 2022.

* cited by examiner

|   | SECOND ELECTRODE ACTIVE MATERIAL | | INACTIVE COATING PORTION | |
|---|---|---|---|---|
|   | THICKNESS | LOADING | THICKNESS | LOADING |
| 1 | 146.5 | 349.5 | 176.4 | 370.6 |
| 2 | 149.3 | 352.7 | 174.6 | 369.4 |
| 3 | 148.2 | 347.2 | 179.3 | 368.5 |

FIG. 6

(a) THICKNESS OF SECOND ELECTRODE BEFORE ROLLING (b) THICKNESS OF SECOND ELECTRODE AFTER ROLLING

SECONDARY BATTERY AND METHOD FOR MANUFACTURING THE SAME

CROSS-REFERENCE TO RELATED APPLICATION

The present application claims the benefit of the priority of Korean Patent Application No. 10-2019-0040973, filed on Apr. 8, 2019, which is hereby incorporated by reference in its entirety.

TECHNICAL FIELD

The present invention relates to a secondary battery and a method for manufacturing the same, and more particularly, to a secondary battery in which, an occurrence of precipitation due to an uneven coating portion occurring when an electrode active material is applied is prevented, and a method for manufacturing the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly in which electrodes and separators are alternately stacked and a case accommodating the electrode assembly, and the electrode assembly has a structure in which the plurality of electrodes and the plurality of separators are alternately stacked.

Here, the plurality of electrodes comprise a first electrode and a second electrode. The first electrode comprises a first collector and a first electrode active material applied on the first collector, and the second electrode comprises a second collector and a second electrode active material applied on the second collector.

The first electrode is a positive electrode, and the second electrode is a negative electrode.

A method for manufacturing the secondary battery having the above configuration comprises an electrode manufacturing step of manufacturing a first electrode and a second electrode and an electrode assembly manufacturing step of manufacturing an electrode assembly by stacking the first electrode and the second electrode with a separator therebetween. The electrode manufacturing step comprises a first electrode manufacturing process of applying a first active material from a coating start portion to a coating end portion of the first collector to manufacture the first electrode and a second electrode manufacturing process of applying a second active material from a coating start portion to a coating end portion of the second collector to manufacture the second electrode.

Here, the first electrode manufacturing process has a problem that the first active material is excessively applied on any one of the coating start portion and the coating end portion of the first collector while the first active material is applied from the coating start portion to the coating end portion of the first collector to cause an uneven coating portion, i.e., a hump. As a result, there is a problem that precipitation occurs on the second electrode that is the negative electrode due to the hump to degrade stability and battery performance.

DISCLOSURE OF THE INVENTION

Technical Problem

The present invention is invented to solve the above problems, and thus the present invention provides a secondary battery, in which an inactive coating portion covering an uneven coating portion occurring on a first electrode that is a positive electrode is formed on a second electrode that is a negative electrode to stably cover the uneven coating portion occurring on the first electrode and thus prevent precipitation from occurring on the second electrode, thereby improving stability and battery performance, and a method for manufacturing the same.

Technical Solution

A secondary battery according to the present invention for achieving the above object comprises: a first electrode having a first collector and a first electrode active material on at least one surface of the first collector; and a second electrode having a second collector and a second electrode active material on at least one surface of the second collector, wherein an uneven coating portion at which the first electrode active material irregularly increases in amount located at at least one of a coating start portion or a coating end portion of the first electrode active material, and wherein an inactive coating portion configured to cover the uneven coating portion is located at at least one of a coating start portion or a coating end portion of the second electrode active material.

The inactive coating portion may be made of the same material as the second electrode active material.

The inactive coating portion may be coated with the second electrode active material in a state in which the at least one of the coating start portion or the coating end portion of the second electrode active material is extended so as to cover the uneven coating portion.

The inactive coating portion may have a thickness greater than a thickness of the second electrode active material from the coating start portion to the coating end portion of the second electrode active material.

The inactive coating portion may have a coating thickness corresponding to a thickness of the uneven coating portion.

The first electrode may be a positive electrode, and the second electrode may be a negative electrode.

The first electrode may further comprise an inactive tape attached to the uneven coating portion.

The inactive tape may be attached to surround the entire uneven coating portion.

A method for manufacturing a secondary battery according to the present invention comprises: a first electrode manufacturing step of applying a first electrode active material on a first surface of a first collector from a coating start portion to a coating end portion and applying the first electrode active material on a second surface of the first collector from the coating start portion to the coating end portion to manufacture a first electrode; and a second electrode manufacturing step of applying a second electrode active material on a first surface of a second collector from a coating start portion to a coating end portion and applying the second electrode active material on a second surface of the second collector from the coating start portion to the coating end portion to manufacture a second electrode, wherein, in the first electrode manufacturing step, an uneven coating portion is formed at at least one of the coating start portion or the coating end portion of the first electrode active material on one of the first surface or the second surface of the first collector due to an increase of a loading amount of the first electrode active material, and wherein, in the second electrode manufacturing step, an inactive coating portion covering the uneven coating portion is formed on at at least one of the coating start portion or the coating end portion of the second electrode active material on one of the first surface or the second surface of the second collector adjacent the uneven coating portion.

In the second electrode manufacturing step, after the at least one of the coating start portion or the coating end portion of the second electrode active material is coated on the one of the first surface or the second surface of the second collector, a loading amount of the second electrode active material may be increased and applied to form the inactive coating portion covering the uneven coating portion.

The inactive coating portion may have a thickness greater than a thickness of the second electrode active material from the coating start portion to the coating end portion of the second electrode active material on the one of the first surface or the second surface of the second collector.

The inactive coating portion may have a thickness corresponding to a thickness of the uneven coating portion.

The method may further comprise, after the second electrode manufacturing step, an electrode rolling step of rolling the first and second surfaces of the first electrode and the second electrode.

The method may further comprise, after the electrode rolling step, a tape attachment step of attaching an inactive tape to the uneven coating portion formed at the first electrode.

The method may further comprise, after the tape attachment step, a secondary battery manufacturing step of interposing a separator between the first electrode and the second electrode to manufacture the secondary battery.

Advantageous Effects

The secondary battery according to the present invention may comprise the inactive coating portion covering the uneven coating portion occurring on the first electrode when the second electrode that is the negative electrode is manufactured. Therefore, the uneven coating portion may be continuously covered to prevent the precipitation from occurring on the second electrode, thereby improving the stability and performance of the secondary battery.

BRIEF DESCRIPTION OF THE DRAWINGS

FIG. 6 is a table illustrating values obtained by measuring thicknesses of a second electrode active material and an inactive coating portion of a second electrode manufactured by the method for manufacturing the secondary battery according to the first embodiment of the present invention.

MODE FOR CARRYING OUT THE INVENTION

Figure 1:
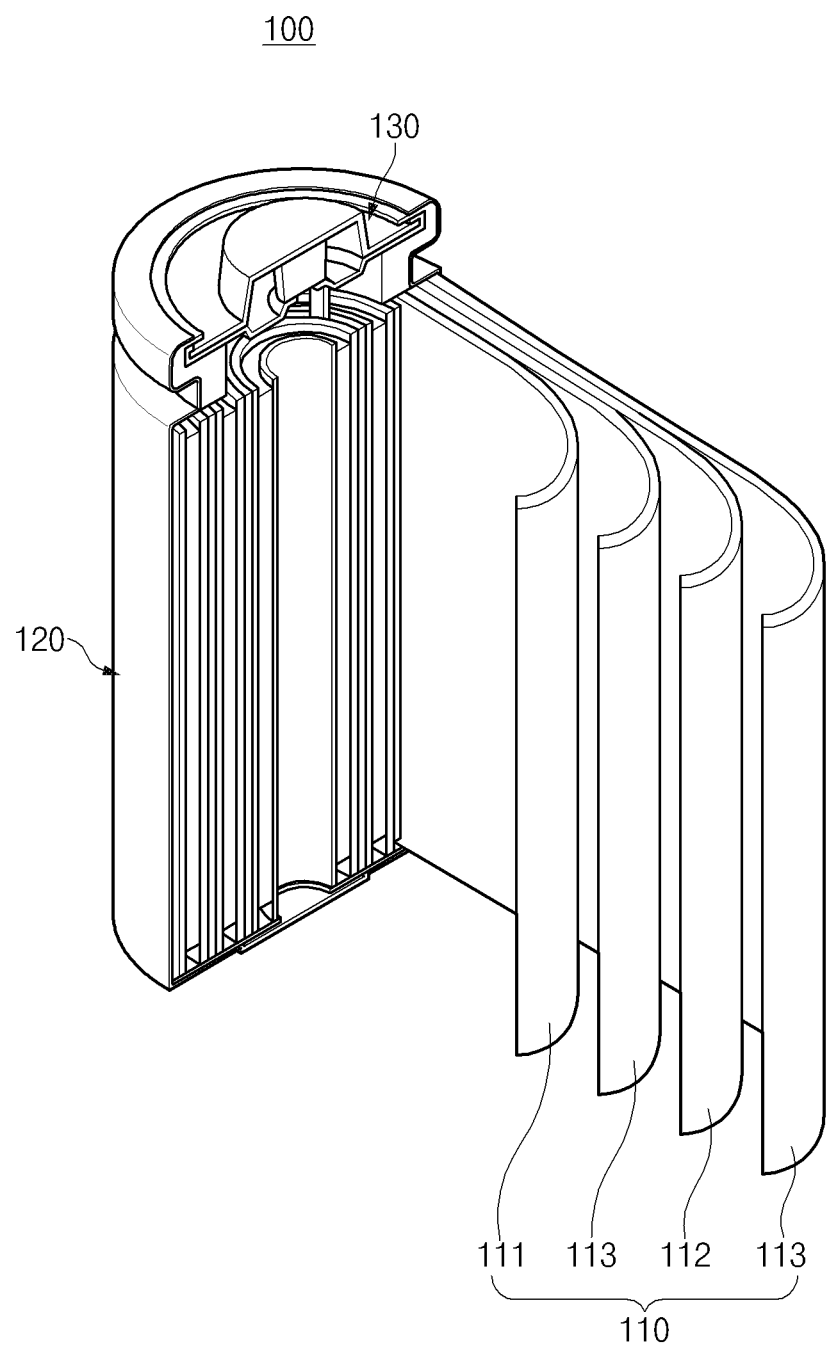
FIG. 1 is a perspective view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to First Embodiment of the Present Invention]

As illustrated in FIG. 1, a secondary battery 100 according to a first embodiment of the present invention comprises an electrode assembly 110, a can 120 accommodating the electrode assembly 110, and a cap assembly 130 mounted in an opening of the can 120.

Figure 2:
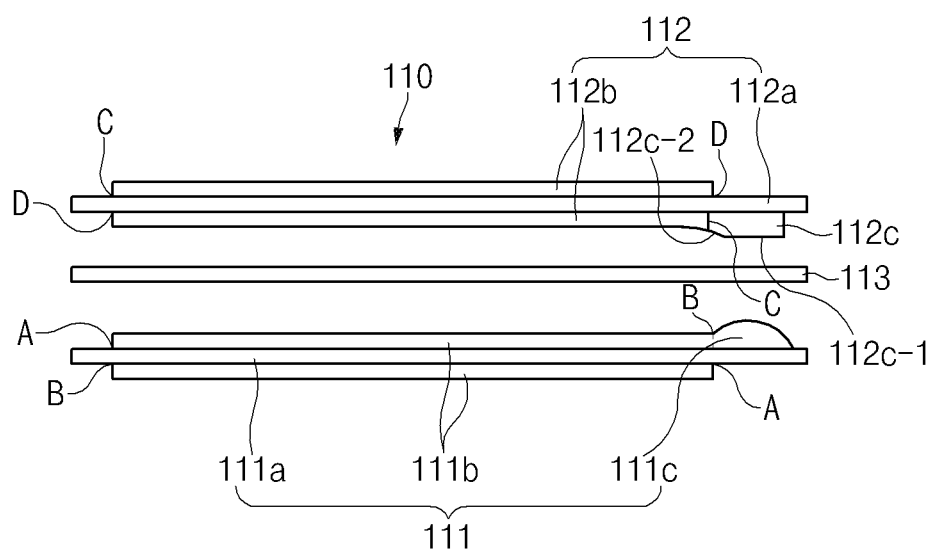
FIG. 2 is a cross-sectional view of an electrode assembly of the secondary battery according to the first embodiment of the present invention.

As illustrated in FIG. 2, the electrode assembly 110 has a structure in which a plurality of electrodes and a plurality of separators are alternately stacked. The plurality of electrodes comprise a first electrode 111 and a second electrode 112. That is, the electrode assembly 110 comprises the first and second electrodes 111 and 112, which are stacked downward, and a separator 113 disposed between the first electrode 111 and the second electrode 112.

The first electrode 111 comprises a first collector 111a and a first electrode active material 111b applied from a coating start portion A to a coating end portion B of the first collector 111a.

The second electrode 112 comprises a second collector 112a and a second electrode active material 112b applied from a coating start portion C to a coating end portion D of the second collector 112a.

Here, the first electrode is a positive electrode, and the second electrode is a negative electrode.

The first electrode 111 that is the positive electrode is coated while the first electrode active material 111b is applied from the coating start portion A to the coating end portion B of the first collector 111a by using a coating device (not shown). Here, since the coating device uniformly moves between the coating start portion A and the coating end portion B except for the coating start portion A and the coating end portion B, the first electrode active material may be uniformly applied. However, although the first electrode active material is applied at a uniform thickness, since the coating on the coating start portion A and the coating end portion B starts or is finished in a state in which the coating device is stopped, the first electrode active material 111b is excessively applied to form an uneven coating portion 111c. That is, as illustrated in FIG. 2, the uneven coating portion 111c is formed by the first electrode active material 111b that is excessively applied from the coating start portion A to the coating end portion B of the first collector 111a.

Since the uneven coating portion 111c formed as described above is unintentionally coated when the first electrode is manufactured, when the first electrode 111 and the second electrode 112 are stacked, lithium may be precipitated on the second electrode 112 due to the uneven coating portion 111c to degrade stability and battery performance.

In order to solve the above problems, the second electrode 112 comprises an inactive coating portion 112c covering the uneven coating portion 111c occurring on the first electrode 111. Thus, the uneven coating portion 111c may be stably covered through the inactive coating portion 112c to prevent the lithium from being precipitated on the electrode, thereby preventing the stability and the battery performance from being degraded.

That is, the inactive coating portion 112c is formed on any one of the coating start portion C and the coating end portion D of the second collector 112a included in the second electrode 112, which corresponds to the uneven coating portion 111c formed on the first electrode. Thus, the uneven coating portion 111c formed on the first electrode 111 may be covered by the inactive coating portion 112c formed on the second electrode 112.

The inactive coating part 112c is made of the same material as the second electrode active material 112b. That is, the inactive coating portion 112c is made of the same material as the second electrode active material 112b applied on the second collector 112a. Thus, it is possible to increase in easy of the manufacture, and in particular, the inactive coating portion 112c and the uneven coating portion 111c are unintentionally coated, but the battery performance may be improved due to the increase of the active material.

That is to say, the inactive coating portion 112c is coated with the second electrode active material 112b from the coating start portion C to the coating end portion D of the second collector 112a. Here, a loading amount of the second electrode active material 112b increases at the coating start portion C and the coating end portion D of the second collector 112a, and thus, the second electrode active material 112b applied on the coating start portion C and the coating end portion D is spread widely to form the inactive coating portion 112c.

In summary, the inactive coating portion 112c may be provided by being coated with the second electrode active material 112b in a state in which at least one of the coating start portion C or the coating end portion D of the second electrode active material 112b extends so as to cover the uneven coating portion 111c. Accordingly, the second electrode active material 112b and the inactive coating portion 112c may be made of the same material to increase in easy of the manufacture.

The inactive coating portion 112c may be coated at a thickness greater than that from the coating start portion C to the coating end portion D of the second electrode active material 112b. That is, since the uneven coating portion 111c occurs due to the increase of the loading amount of the first electrode active material 111b, the inactive coating portion 112c may be coated at a thickness greater than that from the coating start portion C to the coating end portion D of the second electrode active material 112b to stably cover the uneven coating portion 111c.

Particularly, the inactive coating portion 112c has a coating thickness corresponding to that of the uneven coating portion 111c. That is, when the inactive coating portion 112c has a coating thickness less than that of the uneven coating portion 111c, the uneven coating portion 111c may not be stably covered by the inactive coating portion 112c to cause the precipitation on the second electrode 112. Also, when the inactive coating portion 112c has a thickness greater than that of the uneven coating portion 111c, although the uneven coating portion 111c is stably covered, the second electrode active material 112b may be excessively used to significantly increase in manufacturing cost. Thus, the inactive coating portion 112c may have a thickness corresponding to that of the uneven coating portion 111c to reduce the manufacturing cost and stably cover the uneven coating portion 111c.

A surface of the inactive coating portion 112c corresponding to the uneven coating portion 111c may be provided as a flat horizontal surface 112c-1. Thus, even though the surface of the uneven coating portion 111c is uneven, friction between the uneven coating portion 111c and the inactive coating portion 112c may be minimized, and the uneven coating portion 111c may be stably covered.

A connection between the second electrode active material 112b and the inactive coating portion 112c may be provided as an inclined surface so as not to form a stepped portion. Thus, the separator 113 may be prevented from being damaged by interfering with the connection portion between the second electrode active material 112b and the inactive coating portion 112c. Particularly, the first electrode or the second electrode may be prevented from being folded or damaged by interfering with the uneven coating portion 111c at the connection portion between the second electrode active material 112b and the inactive coating portion 112c.

The secondary battery 100 having the above-described configuration according to the first embodiment of the present invention comprises the inactive coating portion 112c on the second electrode 112 that is the negative electrode to stably cover the uneven coating portion 111c occurring on the first electrode 111 and prevent the lithium from being precipitated on the second electrode 112, thereby improving the stability and preventing the battery performance from being degraded.

Figure 3:
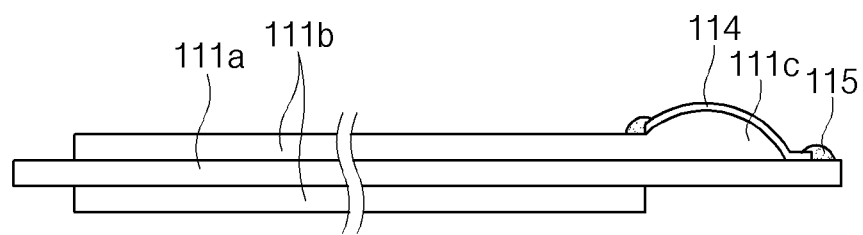
FIG. 3 is a cross-sectional view illustrating an inactive tape of the secondary battery according to the first embodiment of the present invention.

As illustrated in FIG. 3, the secondary battery 100 according to the first embodiment of the present invention may further comprise an inactive tape 114 attached to the uneven coating portion 111c formed on the first electrode 111. That is, when a meandering failure occurs in the first electrode and the second direction, which are stacked downward, the first electrode 111 and the second electrode are stacked at different angles, and thus, the inactive coating portion 112c of the second electrode 112 may not cover the uneven coating portion 111c formed on the first electrode 111. To prevent this phenomenon, the inactive tape 114 may be attached to the uneven coating portion 111c formed on the first electrode 111 to cover the uneven coating portion 111c. Thus, even though the first electrode 111 and the second electrode 112 are stacked at different angles, the uneven coating portion 111c may be stably covered.

The inactive tape 114 may be attached to completely surround the uneven coating portion 111c to stably cover the entire uneven coating portion 111c.

In the secondary battery 100 according to the first embodiment of the present invention, in order to increase in adhesion of an edge surface of the inactive tape, an adhesive 115 may be applied between the edge surface of the inactive tape 114 and the first electrode 111 to improve the adhesion of the edge surface of the inactive tape 114 through the adhesive 115.

Particularly, the inactive tape may be provided as a double-sided tape. As a result, the uneven coating portion 111c and the separator 113, which correspond to each other, may be attached to be connected to each other to prevent the meandering failure of the first electrode 111 having the uneven coating portion 111c from occurring.

Hereinafter, a method for manufacturing the secondary battery according to the first embodiment of the present invention will be described.

[Method for Manufacturing Secondary Battery According to First Embodiment of the Present Invention]

Figure 4:
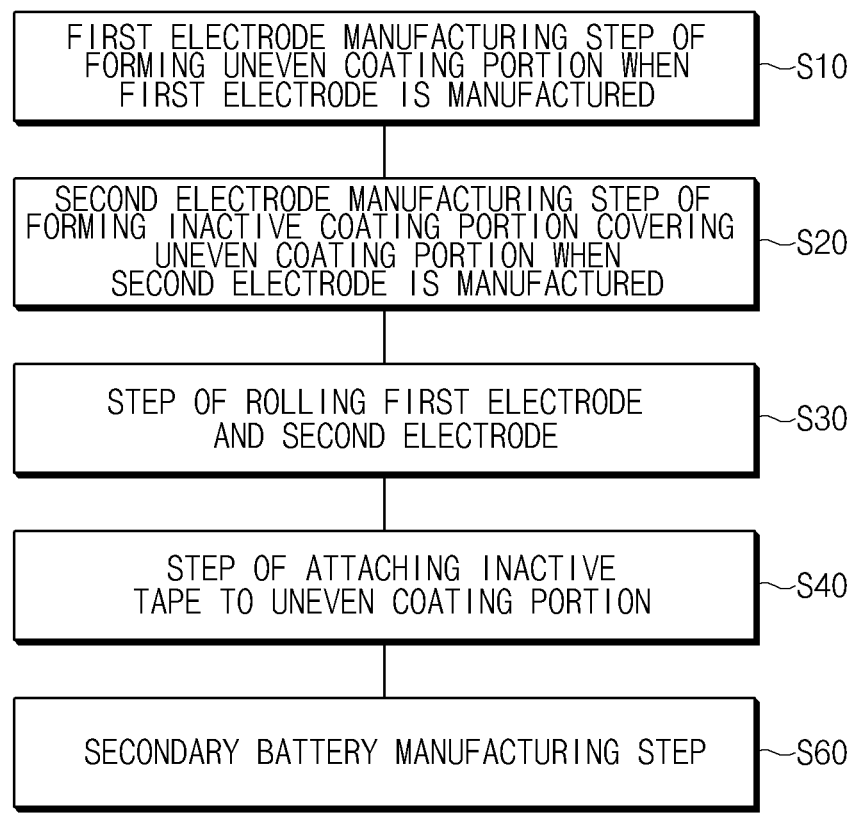
FIG. 4 is a flowchart illustrating a method for manufacturing the second battery according to the first embodiment of the present invention.
Figure 5:
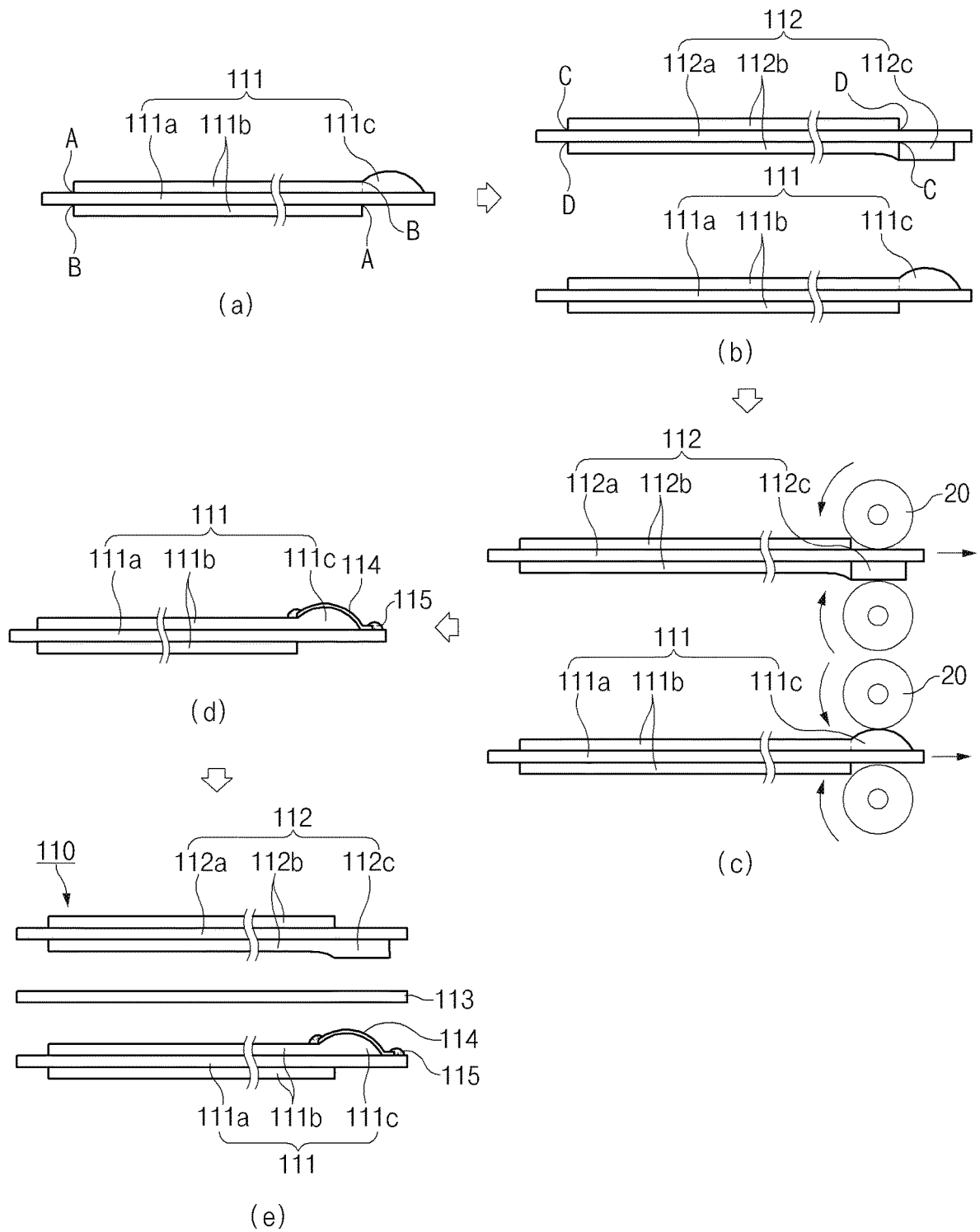
FIG. 5 is a process chart illustrating a method for manufacturing the second battery according to the first embodiment of the present invention.

As illustrated in FIGS. 4 and 5, a method for manufacturing the secondary battery according to the first embodiment of the present invention comprises: a first electrode manufacturing step (S10) of manufacturing a first electrode 111; and a second electrode manufacturing step (S20) of manufacturing a second electrode 112.

First Electrode Manufacturing Step

Referring to FIG. 5(a), in the first electrode manufacturing step (S10), a first electrode active material 111b is applied on one surface (a top surface of a first collector when viewed in FIG. 5(a)) of the first collector 111a from a coating start portion A to a coating end portion B. Next, the first electrode active material 111b is applied on the other surface (a bottom surface of the first collector when viewed in FIG. 5(a)) of the first collector 111a from the coating start portion A to the coating end portion B. The first electrode 111 may be manufactured through the above-described process.

Here, in the first electrode manufacturing step (S10), an uneven coating portion 111c is formed on at least one of the coating start portion A or the coating end portion B due to an increase of a loading amount of the first electrode active material 111b.

Second Electrode Manufacturing Step

Referring to FIG. 5(b), in the second electrode manufacturing step (S20), a second electrode active material 112b is applied on one surface (a top surface of a second collector when viewed in FIG. 5(b)) of the second collector 112a from a coating start portion C to a coating end portion D. Next, the second electrode active material 112b is applied on the other surface (a bottom surface of the second collector when viewed in FIG. 5(b)) of the second collector 112a from the coating start portion C to the coating end portion D. The second electrode 112 may be manufactured through the above-described process.

Here, in the second electrode manufacturing step (S20), an inactive coating portion 112c covering the uneven coating portion 111c is further formed on at least one of the coating start portion C or the coating end portion D of the second electrode active material 112b. That is, in the second electrode manufacturing step (S20), when at least one of the coating start portion C or the coating end portion D of the second electrode active material 112b is coated, the loading amount of the second electrode active material 112b increases to be applied on the inactive coating portion 112c covering the uneven coating portion 111c.

Particularly, in the second electrode manufacturing step (S20), the inactive coating portion 112c is applied thicker than a thickness of the second electrode active material 112b applied from the coating start portion C or the coating end portion D of the second electrode active material 112b to stably cover the uneven coating portion 111c. Furthermore, the inactive coating portion 112c may coated to a thickness corresponding to that of the uneven coating portion 111c to stably cover the uneven coating portion 111c.

After the second electrode manufacturing step (S20), an electrode rolling step (S30) of rolling a surface of each of the first electrode 111 and the second electrode 112 is further performed.

Electrode Rolling Step

Referring to FIG. 5(c), in the electrode rolling step (S30), the first electrode 111 and the second electrode 112 are rolled using a rolling roll 20 to uniformly adjust a coating thickness of each of the first electrode active material 111b of the first electrode 111 and the second electrode active material 112b of the second electrode 112.

Particularly, in the electrode rolling step (S30), the excessively protruding uneven coating portion 111c and the inactive coating portion 112c covering the uneven coating portion 111c are rolled together with each other to reduce a thickness of each of the uneven coating portion 111c and the inactive coating portion 112c.

After the electrode rolling step (S30), a tape attachment step (S40) of attaching an inactive tape to the uneven coating portion formed on the first electrode is further performed.

Tape Attachment Step

Referring to FIG. 5(d), the tape attachment step S40 attaches the inactive tape 114 to surround the entire uneven coating part 111c formed on the first electrode 111. Then, even though a stacking error of the first and second electrodes 111 and 112 occurs, the uneven coating part 111c may be stably covered through the inactive tape 114.

An adhesive 115 is further applied to a boundary between the inactive tape 114 and the uneven coating portion 111c to increase in adhesion of an edge surface of the inactive tape 114.

After the tape attachment step (S40), a secondary battery manufacturing step (S60) for completing the secondary battery 100 is further performed.

Secondary Battery Manufacturing Step

Referring to FIG. 5(e), in the secondary battery manufacturing step (S60), a separator 113 is disposed between the first electrode 111 and the second electrode 112 to manufacture an electrode assembly 110.

Also, as illustrated in FIG. 1, the electrode assembly 110 is accommodated in a can 120, and a cap assembly 130 is mounted in an opening of the can 120 to manufacture the secondary battery 100.

Here, as the uneven coating portion 111c formed on the first electrode 111 and the inactive coating portion 112c of the second electrode 112 are disposed to correspond to each other, the occurrence of the precipitation on the second electrode 112 may be prevented to improve stability and prevent battery performance from being degraded.

Experimental Example

Three second electrodes, which are negative electrodes manufactured by the method for manufacturing the secondary battery of the present invention, are prepared, and thickness and loading amounts of the prepared second electrodes are measured. Particularly, a thickness at a portion of a second electrode active material applied on each of the second electrodes and a thickness at a portion of an inactive coating portion are measured.

Here, the electrode thickness may be measured as high as about 30 μm, and the loading amount may be measured as high as about 20 mg/25 $cm^2$. Also, a nitrogen/phosphorus ratio may increase from 104% to 110%, and a supply rate may increase from 23.6% to 42.6% in the second electrode, which is the negative electrode, compared to the first electrode, which is the positive electrode. This may prevent lithium from being precipitated on the second electrode even if the uneven coating portion is formed on the first electrode that is the positive electrode.

Measurement Result

As a result of measuring as described above, an experiment table as shown in FIG. 6 may be obtained.

That is, when comparing the thicknesses and loading amounts of the three second electrodes 112 manufactured by the method for manufacturing the secondary battery according to the present invention, it is seen that the thickness and loading amount of the inactive coating portion 112c that is a single-sided coating portion are greater than the thickness and loading amount of the second electrode active material 112b that is a double-sided coating portion. Therefore, the inactive coating portion 112c for covering the uneven coating portion 111c formed on the first electrode 111 may be stably formed.

Also, FIG. 7(a) illustrates thicknesses of the three second electrodes 112 manufactured by the method for manufacturing the secondary battery before rolling according to the present invention, and FIG. 7(b) illustrates thicknesses of the three second electrodes 112 manufactured by the method for manufacturing the secondary battery after rolling according to the present invention.

Figure 7:
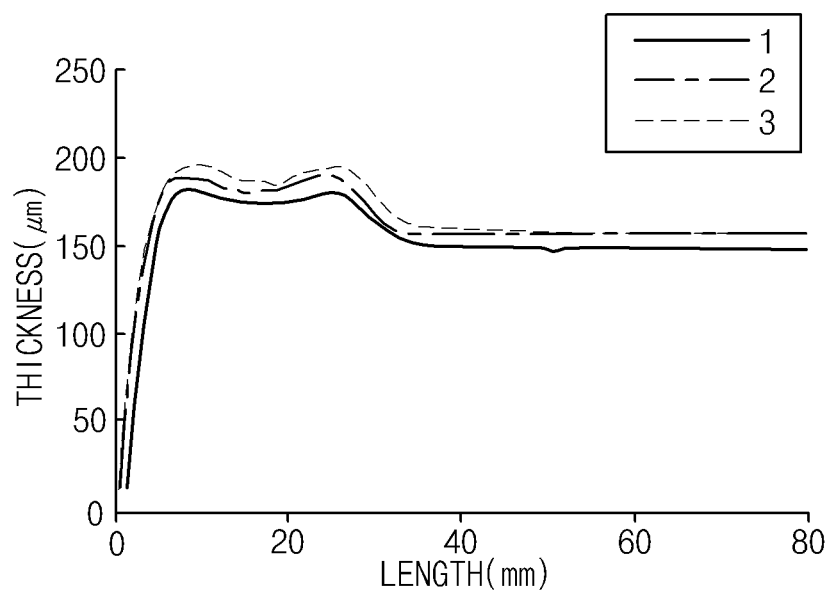
FIG. 7 is a graph illustrating a thickness of the second electrode before and after rolling, which is manufactured by the method for manufacturing the secondary battery according to the first embodiment of the present invention.
Figure 7:
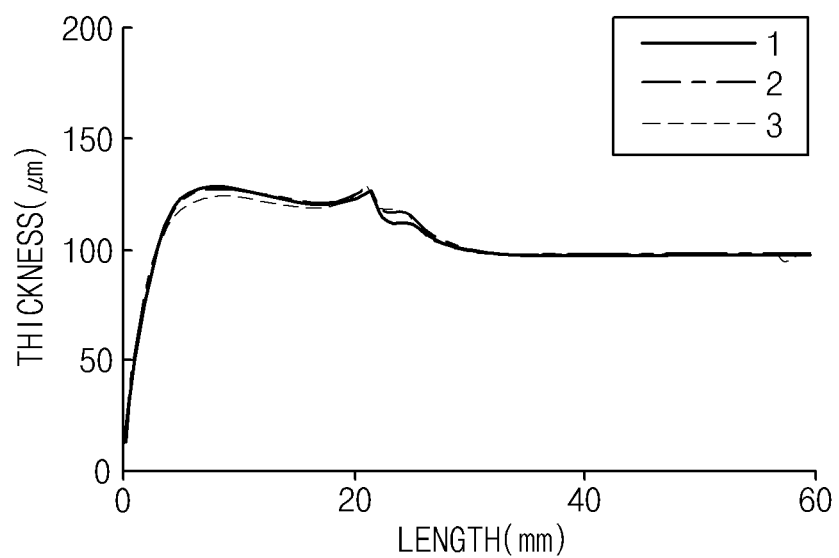

Referring to the graph of FIG. 7, it is seen that the thickness of each of the second electrode active material applied on the second electrode 112 and the inactive coating portion is reduced, and in particular, it is seen that a portion between the second electrode active material and the inactive coating portion is changed into a gentle inclined surface. Therefore, the separator may be prevented from being damaged by interfering between the second electrode active material and the inactive coating portion.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
a first electrode having a first collector and a first electrode active material on at least one surface of the first collector; and
a second electrode having a second collector and a second electrode active material on at least one surface of the second collector,
wherein an uneven coating portion at which the first electrode active material increases in amount is located at at least one of a coating start portion or a coating end portion of the first electrode active material,
wherein a second coating portion configured to cover the uneven coating portion is located at at least one of a coating start portion or a coating end portion of the second electrode active material,
wherein the first electrode further comprises an inactive tape attached to the uneven coating portion, and
wherein the inactive tape comprises an adhesive applied to overlap edges of the inactive tape and one of the first electrode active material and first collector.

2. The secondary battery of claim 1, wherein the second coating portion is made of a same material as the second electrode active material.

3. The secondary battery of claim 1, wherein the second coating portion is coated with the second electrode active material in a state in which the at least one of the coating start portion or the coating end portion of the second electrode active material is extended so as to cover the uneven coating portion.

4. The secondary battery of claim 1, wherein the second coating portion has a thickness greater than a thickness of the second electrode active material from the coating start portion to the coating end portion of the second electrode active material.

5. The secondary battery of claim 1, wherein the second coating portion has a thickness corresponding to a thickness of the uneven coating portion.

6. The secondary battery of claim 1, wherein the first electrode is a positive electrode, and the second electrode is a negative electrode.

7. The secondary battery of claim 1, wherein the inactive tape is attached to surround the entire uneven coating portion.

8. A method for manufacturing a secondary battery, the method comprising:
a first electrode manufacturing step of applying a first electrode active material on a first surface of a first collector from a coating start portion to a coating end portion and applying the first electrode active material on a second surface of the first collector from the coating start portion to the coating end portion to manufacture a first electrode;
a second electrode manufacturing step of applying a second electrode active material on a first surface of a second collector from the coating start portion to the coating end portion and applying the second electrode active material on a second surface of the second collector from the coating start portion to the coating end portion to manufacture a second electrode,
wherein, in the first electrode manufacturing step, an uneven coating portion is formed at at least one of the coating start portion or the coating end portion of the first electrode active material on one of the first surface or the second surface of the first collector due to an increase of a loading amount of the first electrode active material,
wherein, in the second electrode manufacturing step, a second coating portion covering the uneven coating portion is formed at at least one of the coating start portion or the coating end portion of the second electrode active material on one of the first surface or the second surface of the second collector; and
a tape attachment step of attaching an inactive tape to the uneven coating portion formed at the first electrode,
wherein the inactive tape comprises an adhesive applied to overlap edges of the inactive tape and one of the first electrode active material and first collector.

9. The method of claim 8, wherein, in the second electrode manufacturing step, after the at least one of the coating start portion or the coating end portion of the second electrode active material on the one of the first surface or the second surface of the second collector is coated, a loading amount of the second electrode active material is increased and applied to form the second coating portion covering the uneven coating portion.

10. The method of claim 9, wherein the second coating portion has a thickness greater than a thickness of the second electrode active material from the coating start portion to the coating end portion of the second electrode active material on the one of the first surface or the second surface of the second collector adjacent to the second coating portion.

11. The method of claim 9, wherein the second coating portion has a thickness corresponding to a thickness of the uneven coating portion.

12. The method of claim 8, further comprising, after the second electrode manufacturing step, an electrode rolling step of rolling the first electrode and the second electrode.

13. The method of claim 8, further comprising, after the tape attachment step, a secondary battery manufacturing step of interposing a separator between the first electrode and the second electrode to manufacture the secondary battery.

* * * * *